United States Patent
Ishikawa et al.

(10) Patent No.: US 8,905,430 B2
(45) Date of Patent: Dec. 9, 2014

(54) COVER BODY FOR AIRBAG DEVICE

(71) Applicant: Nihon Plast Co., Ltd., Fujinomiya (JP)

(72) Inventors: Tomotaka Ishikawa, Fujinomiya (JP); Daisuke Ishioroshi, Fujinomiya (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/090,839

(22) Filed: Nov. 26, 2013

(65) Prior Publication Data

US 2014/0145419 A1    May 29, 2014

(30) Foreign Application Priority Data

Nov. 29, 2012  (JP) ................... 2012-261565

(51) Int. Cl.
*B60R 21/2165* (2011.01)
*B60R 21/215* (2011.01)

(52) U.S. Cl.
CPC ....... *B60R 21/2165* (2013.01); *B60R 21/21656* (2013.01); *B60R 2021/21543* (2013.01); *B60R 21/215* (2013.01)
USPC ........................................ 280/728.3; 280/731

(58) Field of Classification Search
CPC .............................................. B60R 2021/21543
USPC ................................................. 280/731, 728.3
See application file for complete search history.

(56) References Cited

U.S. PATENT DOCUMENTS

| 8,196,953 B2 * | 6/2012 | Weigand et al. | 280/728.3 |
| 8,210,565 B2 * | 7/2012 | Hayashi | 280/728.3 |
| 8,517,415 B2 * | 8/2013 | Iida et al. | 280/728.3 |
| 8,585,082 B2 * | 11/2013 | Yamaji | 280/731 |
| 8,651,680 B2 * | 2/2014 | Rick | 362/84 |
| 2012/0074672 A1 | 3/2012 | Iida et al. | |
| 2013/0285355 A1 | 10/2013 | Muramatsu et al. | |

FOREIGN PATENT DOCUMENTS

| JP | 2000-255361 A | 9/2000 |
| JP | 2000-272458 A | 10/2000 |
| JP | 2001-162997 | 6/2001 |
| JP | 3833428 B2 | 7/2006 |
| JP | 2007-091050 A | 4/2007 |
| JP | 2008-056101 A | 3/2008 |
| JP | 2008-087577 A | 4/2008 |
| WO | WO 2013/145931 A1 | 10/2013 |
| WO | WO 2014/050523 A1 | 4/2014 |

OTHER PUBLICATIONS

British Search and Examination Report dated Jun. 25, 2014 issued in Great Britain Patent Application No. GB1320796.4.

* cited by examiner

*Primary Examiner* — Drew Brown

(74) *Attorney, Agent, or Firm* — Arent Fox LLP

(57) ABSTRACT

The present invention provides a cover body for airbag device that is capable of easily mounting an emblem that is provided with an emblem body having a narrow portion while ensuring its related mounting strength. A lock pin is protruded at a main body portion with a relatively large width of the emblem body. A hook pin is protruded at a narrow portion with a relatively small width of the emblem body. The lock pin is inserted into a first door portion and then is inserted into a thorough hole of a back plate on a rear face side. The hook pin is inserted into the first door portion, and is hooked therewith.

4 Claims, 11 Drawing Sheets

(a)

(b)

(a)

(b)

COVER BODY FOR AIRBAG DEVICE

CROSS REFERENCE TO RELATED APPLICATIONS

This application claims priority of Japanese Patent Application No. 2012-261565 filed on Nov. 29, 2012. The contents of this application are incorporated herein by reference in their entirety.

BACKGROUND OF THE INVENTION

1. Field of the Invention

The present invention relates to a cover body for airbag device, provided with a decorative member mounted on a door portion that is formed by a cover main body portion cleaving at the time of deployment of an airbag.

2. Description of the Related Art

Conventionally, an airbag device provided at a lock portion of a steering wheel of a vehicle such as an automobile has been employed. This airbag device is provided with: a baggy airbag; an inflator configured to supply a gas to this airbag; and a cover body for airbag device configured to cover and house the airbag at the time of non-expansion. In addition, this airbag device is configured in such a manner that if a vehicle receives an impact exerted by a collision or the like, for example, a gas is supplied from the inflator to the airbag, whereby the airbag inflates, and due to the inflation of this airbag, the cover body breaks along a predetermined break line, that is, along a tear line and then a plurality of door portions are formed and further these door portions respectively expand around a hinge portion, whereby the airbag expands to an occupant side to thereby constrain and protect the occupant.

With respect to such a cover body for airbag device, there has been known a construction to mount an emblem (an ornament) that serves as a decorative member on a substantial neutral part of the cover main body portion. In this construction, for example, a lock pin protruding on a back side of an emblem body is inserted into the cover main body portion, and this lock pin is locked with the back side of the cover main body portion by means of thermal caulking such as welding (refer to Japanese Unexamined Patent Application Publication No. 2000-272458 and Japanese Patent Gazette No. 3833428, for example).

However, in this construction, there is a need for the mounting step such as welding of a lock pin, and fine resin shavings drop from a deformed lock pin at the time of welding and then it is unavoidable that there occurs an increase in manufacturing cost due to an increase in the number of working steps such as there being a need for the work process for removing these resin shavings.

Therefore, for example, there has been known a construction in which a lock portion provided at a tip end of a lock pin that protrudes on a back side of an emblem body is inserted into, and is locked with, an insert hole as a lock receptacle portion provided at a mounting member that is disposed on a back face side of a cover main body portion, whereby an emblem is locked while the cover main body portion is sandwiched between the emblem body and the mounting member to thereby reduce the number of working steps of mounting the emblem (refer to Japanese Unexamined Patent Application Publication No. 2000-255361 and Japanese Unexamined Patent Application Publication No. 2008-56101, for example).

However, in this construction, in the case where the emblem body has a narrow portion such as a frame shape, for example, it is not easy to set a lock pin with a sufficient strength at this narrow portion, and in addition, there is a need to separately provide a mounting reinforce structure of this narrow portion, thus causing an increase in manufacturing cost.

As described above, there is a demand for a construction that is capable of easily mounting an emblem provided with an emblem body having a narrow portion to a cover main body portion, the construction being capable of ensuring its related mounting strength.

The present invention has been made in view of such a circumstance, and it is an object of the present invention to provide a cover body for airbag device that is capable of easily mounting a decorative member provided with a decorative member having a narrow portion to a cover main body portion while ensuring its related mounting strength.

SUMMARY OF THE INVENTION

A cover body for airbag device, according to a first aspect of the present invention, comprises: a cover main body portion configured to cover a housed airbag; a tear line configured to define the cover main body portion, the tear line cleaving at a time of deployment of the airbag to form a door portion; and a decorative member, the decorative member including: a decorative body having a decorative main body and a narrow portion that is formed so as to be continuous to the decorative main body, the narrow portion being smaller in width than the decorative main body, the decorative body being located on a front face side of the door portion; a mounting member that is separate from the decorative body, and that is located on the back face side of the door portion; a main lock portion that is protruded to either one of the decorative main body of the decorative body and the mounting member, and that is inserted into the door portion; a lock receptacle portion which is provided at a remaining one of the decorative main body of the decorative body and the mounting member, and in which the main lock portion that is inserted into the door portion is inserted to thereby lock the main lock portion; and an auxiliary hook portion that is protruded to the narrow portion of the decorative body, and that is inserted into and hooked with the door portion.

A cover body for airbag device, according to a second aspect of the present invention, is directed to the cover body for airbag device, according to the first aspect of the present invention, and is provided in such a manner that the narrow portion is located at least at a part of a periphery of the decorative main body, and the auxiliary hook portion is located at the narrow portion, and is disposed at least at a part of a periphery of the main lock portion.

A cover body for airbag device, according to a third aspect of the present invention, is directed to the cover body for airbag device, according to the first aspect of the present invention, and is provided in such a manner that the auxiliary hook portion is formed so as to be thinner than the main lock portion.

A cover body for airbag device, according to a fourth aspect of the present invention, is directed to the cover body for airbag device, according to the first aspect of the present invention, is provided in such a manner that the auxiliary hook portion includes a claw portion, and is provided in plurality, and the claw portion of one auxiliary hook portion and the claw portion of a remaining auxiliary hook portion are protruded oriented in a direction in which the claw portions cross each other.

With the cover body for airbag device, according to the first aspect of the present invention, a comparatively thick decorative main body is reliably retained by inserting a main lock portion that is inserted into a door portion of a cover main body portion into a lock receptacle portion and then locking the inserted lock portion therewith, and a narrow portion which is comparatively small in width and in which setting of the main lock portion is not easy is reliably retained by inserting the narrow portion into a door portion of the cover main body portion and then hooking the inserted narrow portion by means of an auxiliary hook portion, and thus, by appropriately using these main lock portion and the auxiliary hook portion together, a decorative member provided with a decorative body having a narrow portion can be easily mounted on the cover main body portion while its related mounting strength is ensured.

With the cover body for airbag device, according to the second aspect of the present invention, in addition to an advantageous effect of the cover body for airbag, according to the first aspect of the present invention, the auxiliary hook portion is provided at a narrow portion located at least at a part of the periphery of the decorative main body, and is disposed at least at a part of the periphery of the main lock portion, whereby at least a part of the periphery of a portion that is rigidly locked by means of the lock between the main lock portion and the lock receptacle portion is locked with the cover main body portion by means of the auxiliary hook portion, and the decorative body can be retained at the cover main body portion more reliably.

With the cover body for airbag device, according to the third aspect of the present invention, in addition to an advantageous effect of the cover body for airbag, according to the first aspect of the present invention, the auxiliary hook portion is formed so as to be thinner than the main lock portion, and the auxiliary width portion can be easily set at the narrow portion regardless of whatsoever the shape of the narrow portion may be.

With the cover body for airbag device, according to the fourth aspect of the present invention, in addition to an advantageous effect of the cover body for airbag, according to the first aspect of the present invention, among a plurality of auxiliary hook portions, a claw portion of one auxiliary hook portion and a claw portion of a remaining hook portion are protruded so as to be oriented in a direction in which these claw portions cross each other, whereby movement of the decorative body can be restrained more reliably by means of these claw portions.

BRIEF DESCRIPTION OF THE DRAWINGS

FIG. 3 (*b*1) is a front view thereof; and FIG. 3 (*a*2) is a sectional view showing a state in which the auxiliary hook portion of the decorative member of the same cover body for airbag device is hooked with the cover body; and FIG. 3 (*b*2) is a front view thereof.

DESCRIPTION OF THE PREFERRED EMBODIMENTS

Hereinafter, an embodiment of a cover body for airbag device, according to the present invention, will be described with reference to the drawings.

Figure 9:
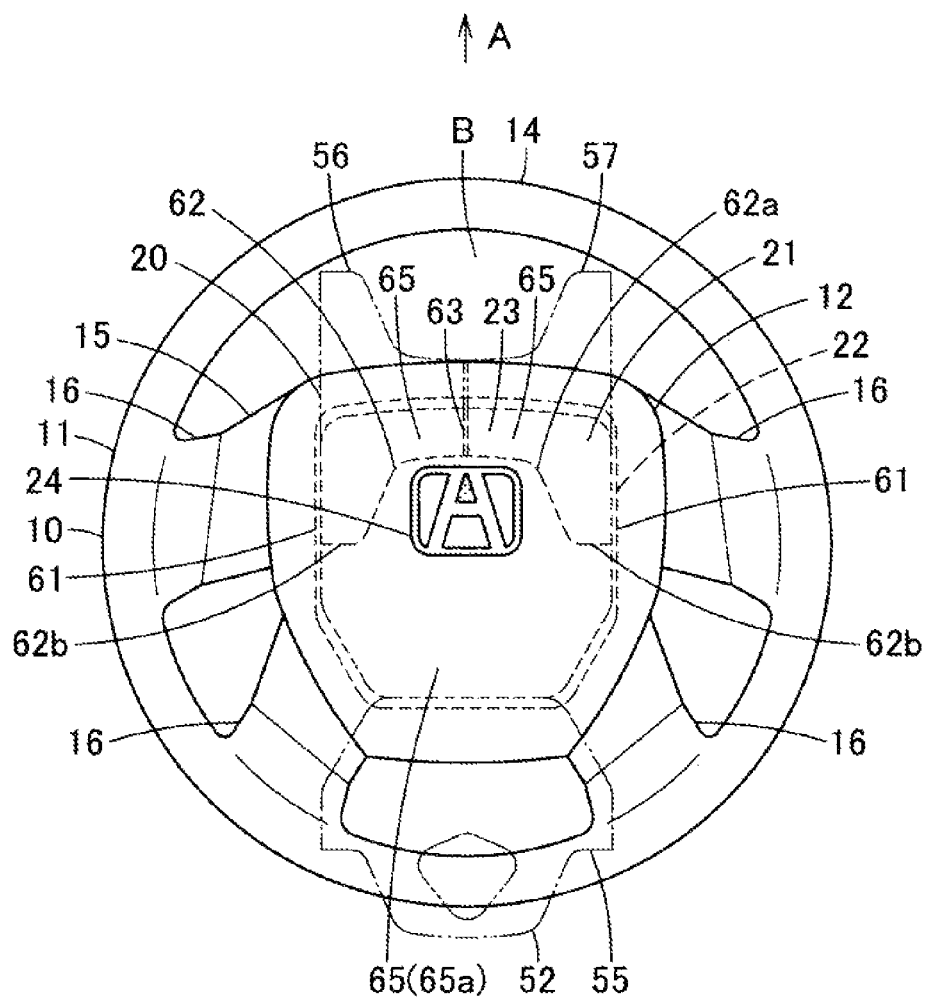
FIG. 9 is a front view showing a steering wheel provided with the same cover body for airbag device.

In FIG. 9, reference numeral 10 designates a steering wheel that serves as a means for handle an automobile that is a vehicle, and this steering wheel 10 is provided with: a steering wheel body 11 that serves as a handle main body configured to carry out steering; and an airbag device 12 that is attached to an occupant side of this steering wheel body 11. It is to be noted that the steering wheel 10 is attached to a steering shaft that is provided in a vehicle in a state in which generally inclined, and however, hereinafter, a description will be given assuming that with reference to a cruising state of a vehicle, a steering shaft side is defined as a rear face side, an occupant side is defined as a front face side, and a direction facing to a front glass (the direction indicated by the arrow A) is defined as a top side.

In addition, the steering wheel body 11 is made of: a rim portion 14 that is a grip portion referred to as a gripping portion forming a ring shape; a boss portion 15 located inside of this rim portion 14; and a plurality of, in the present embodiment, four spoke portions 16 configured to connect these rim portion 14 and boss portion 15 to each other.

In order to ensure a good visibility with respect to gauging meters or the like provided in an instrumental panel, the four spoke portions 16 are respectively disposed on both sides, on an upper side and a lower side of the boss portion 15 in a forwarding state, and on the upper side of the boss portion 15, an opening B for visual recognition of gauging meters, which is a comparatively large opening, is defined.

Further, although not shown, at a rear face part of the boss portion 15, a substantially cylindrical boss attached to a steering shaft is provided, and a boss plate constituting a core body is integrally fixedly secured to this boss by means of internal chilling of a magnesium alloy or the like with die cast, etc. Furthermore, from this boss plate, a cored bar of a spoke portion 16 is integrally extended, or alternatively, is fixedly secured by means of welding or the like. Still furthermore, a cored bar of the rim portion 14 is fixedly secured to the cored car of this spoke portion 16 by means of welding or the like. A skin portion made of a soft foamed polyurethane or the like is formed at an outer circumferential part of the cored bar of these rim portions 14 and at an outer circumferential part of a portion on the side of the rim portion 14 of a cored bar of the spoke portion 16, and further, all or part of the outer circumference of this skin portion is covered with a natural or artificial leather.

On the other hand, the airbag device 12 is also referred to as an airbag module, and is disposed so as to cover a front face side of the boss portion 15 of the steering wheel body 11. This airbag device is provided with: a base plate that serves as a member targeted to be mounted, the base plate being made of a metal plate; a bag-shaped air bag; and an inflator configured to jet a gas or the like, and is provided with a resin cover body 20 shown in FIG. 1 to FIG. 9. In addition, the base plate is mounted on the steering wheel body 11 via a horn plate or a bracket portion or the like, and these airbag, inflator, and cover body 20 are mounted on this base plate and then a finely folded airbag is covered with the cover body 20.

In addition, the cover body 20 is also referred to as a casing body, a pad, or a module cover or the like, and a top plate portion 21 configured to cover a part of the boss portion 15 and the spoke portion 16; and a peripheral plate portion 22 that is a cylindrically protruded circumferential wall formed in the shape of a square prism or the like from a rear face (a back face) of this top plate portion 21 are integrally formed of a synthetic resin or the like. Further, a portion surrounded by the top plate portion 21 and the peripheral plate portion 22 of the cover body 20 is employed as an airbag housing portion configured to house a folded airbag; a portion exposed to a front face side of this airbag housing portion is employed as a front plate portion 23 that serves as a cover main body portion, and is located at a central part of this front plate portion 23 and further an emblem 24 that serves as a decorative member is provided. It is to be noted that the top plate portion 21 can employ a variety of constructions in terms of design, whereas in the embodiment, the top plate portion 21 is formed so as to be slightly larger than the peripheral plate portion 22 in frontal view substantially taken along the shape of the boss portion 15.

Furthermore, the emblem 24 is also referred to as an ornament or the like, and is provided with: an emblem body 26 that serves as a decorative body which is molded with a hard or soft synthetic resin, and to which surface treatment such as coating or plating is appropriately applied; and a back plate 27 that serves as a mounting member that is molded with a hard synthetic resin, for example. This emblem is secured while the front plate portion 23 of the cover body 20 is sandwiched between these emblem body 26 and back plate 27 (FIG. 1 (*a*), FIG. 1 (*b*), and FIG. 8).

Here, the emblem body 26 is also referred to as an upper plate or an upper emblem, and can be formed in a variety of shapes, and in the embodiment, this emblem body is integrally provided with: a main body portion 31 that serves as a decorative main body; and a narrow portion 32 that is a very finely formed portion surrounding the periphery of this main body portion 31, and is formed in a linearly symmetrical shape in a transverse direction. In addition, on a rear face (back face) side of the main body portion 31, that is, on an opposite side to the front plate portion 23, lock pins 33 that serves as main lock portions that are one or a plurality of, in the embodiment, three pins are protruded along a front face and rear face direction (in a forward and backward direction), and on a rear face (back face) side of the narrow portion 32, that is, on an opposite side to the front plate portion 23, hook pins 34 that serves as auxiliary hook portions that are one or a plurality of, in the embodiment, six pins are protruded along the front face and rear face direction (the forward and backward direction (FIG. 4 (*a*) to FIG. 4 (*c*) and FIG. 5). That is, the lock pins 33 and the hook pins 34 are protruded along the same direction each other.

The main body portion 31 is a central part that is a center for designing of the emblem body 26, and this body portion is formed in an A shape viewed from a front side, for example, by a trapezoidal main body primary portion 31*a* that is gradually larger in width from an upper side to a lower side; a color tone portion 31*b* that is provided in a trapezoidal shape at a central part of the main body primary portion 31*a*; and leg portions 31*c*, 31*c* that are elongated rod-shaped main body weak portions protruding from both lower sides to a lower side of the main body primary portion 31*a* (the thinnest part in the main body portion 31).

In addition, the narrow portion 32 is a peripheral portion (a frame portion) that is a periphery for designing of the emblem body 26; is formed in a rectangular shape (a frame shape) which surrounds the periphery of the main body portion 31 and in which four corners each are curved in an arc shape; and is formed so that a width which is smaller than that of the main body portion 31 (the leg portions 31*c*, 31*c*), in other words, a dimension in a crossing (orthogonal) direction to a longitudinal direction (the smallest dimension except a thickness) is sufficiently small. That is, this narrow portion 32 is provided with: both side edges 32*a*, 32*a* located on both of the left and right sides; and both end edges 32*b*, 32*b* connecting these both side edges 32*a*, 32*b* at top and bottom positions. Further, the main body primary portion 31*a* of the main body portion 31 is continuous to a lower part of an upper end edge 32*b*, and the leg portions 31*c*, 31*c* of the main body portion 31 are continuous to an upper part of a lower end edge 32*b*, whereby the main body portion 31 and the narrow portion 32 are integrally formed. In other words, the main body portion 31 and the narrow portion 32 are continuous to the upper and lower end edges 32*b*, 32*b*, and the left and right side edges 32*a*, 32*a* are spaced from the main body portion 31. Furthermore, lateral opening portions 37, 37 that are opening portions are opened between the main body portion 31 and the narrow portion 32, namely between the main body portion 31 (the main body primary portion 31*a* and the leg portions 31*c*, 31*c*) and both side edges 32*a*, 32*a*, and a lower opening portion 38 that is an opening portion is opened between the main body primary portion 31*a* and both leg portions 31*c*, 31*c* and the lower end edge 32*b*.

Further, the lock pin 33 is configured to connect the emblem body 26 and the pack plate 27 to each other, and this lock pin is formed in a substantially cylindrical shape, and has, at a tip end part thereof, a lock portion 41 that is diametrically large in a stepped shape with respect to a base end side. It is to be noted that the layout of this lock pin 33 can be appropriately set according to a shape thereof or the like as long as the emblem body 26 can be supported in a well-balanced manner, and in the embodiment, a first lock pin 33*a* located at a central part of the main body portion 31 of the emblem body 26, for example, and second lock pins 33*b*, 33*b* respectively located at both leg portions 31*c*, 31*c* are set, and are disposed in the shape of an isosceles triangle when they are viewed from a front side. Therefore, the first lock pin 33*a* and the second lock pin 33*b* are spaced from each other in a vertical direction.

In addition, the hook pin 34 is configured to hook the emblem body 26 with the front plate portion 23 of the cover body 20. This hook pin is formed in a substantial square prism which is thinner than the lock pin 33, a cross section of which forms an elongated rectangle in a vertical direction; and is located at the narrow portion 32, and is disposed on the periphery outward of the lock pin 33. In other words, this hook pin 34 is located entirely (substantially entirely) of a sectional external view thereof so as to be more inward than a sectional external view of this lock pin 33 as compared with the lock pin 33 in cross section in an orthogonal direction to a protrusion direction. In addition, this hook pin 34 has a claw portion 43 at a tip end part thereof. This claw portion 43 is set so that a parting line of a die at the time of molding of the emblem body 26 is not located at a tip end, and each corner portion of the tip end is chamfered and rounded. It is to be noted that the layout of the hook pin 34 can be appropriately set according to a shape thereof or the like as long as the emblem body 26 can be supported in a well-balanced manner, whereas in the embodiment, the first to third hook pins 34*a*, 34*b*, 34*c* respectively located at both side edges 32*a*, 32*a* of the narrow portion 32 of the emblem body 26, for example, are set so as to be vertically spaced from each other.

Here, the first and third claw portions 43*a* and 43*c* of the first and third hook pin 34*a* and 34*c* that are located on the top and bottom of both sides respectively protrude outward, that is, on an opposite center side in a transverse direction, in other words, in a direction in which they are spaced from each other. That is, the first and third claw portions 43*a* and 43*c* that are located more leftward than the center in the transverse direction of the emblem body 26 protrude so as to be oriented in a leftward direction, and the first and third claw portions 43*a* and 43*c* that are located more rightward than the center in the transverse direction of the emblem body 26 protrude so as to be oriented in a rightward direction. In addition, the second claw portion 43*b* of the second hook pin 34*b* that is located at a central part in a vertical direction protrudes vertically, that is, in such a manner so as to be oriented to the first and third hook pins 34*a* and 34*c*. Therefore, the first and third claw portions 43*a* and 43*c* and the second claw portion 43*b* protrude so as to be oriented in a crossing (orthogonal) direction each other. Further, the first hook pin 34*a* is located in proximity to an upper end of the side edge 32*a* that is more upward than the first lock pin 33*a*; the second hook pin 34*b* is located more downward than the first lock pin 33*a* and more upward than the second lock pins 33*b*, 33*b*, and the third hook pin 34*c* is located in proximity to a lower end of the side edge 32*a* more downward than the second lock pins 33*b*, 33*b*. That is, in the vertical direction, the first lock pin 33*a* is located between the first and second hook pins 34*a* and 34*b*, and the second lock pins 33*b*, 33*b* are located between the second and third hook pins 34*b* and 34*c*.

In addition, the back plate 27 is also referred to as a lower emblem or the like, and can be formed in a variety of shapes as long as the emblem body 26 can be secured to the front plate portion 23, whereas this back plate is formed in the shape of a substantially triangular plate of which corner portions each are curved in an arc shape, and is linearly symmetrical in the transverse direction; and an insert hole 46 that serves as a lock receptacle portion with which each lock pin 33 of the emblem body 26 is inserted (press fitted) and locked is provided in correspondence with the number of lock pins 33. Further, on the rear face side of this back plate 27, a claw-shaped positioning portion 47 is protruded on the lower side of the central part in the transverse direction (FIG. 6 (*a*) and FIG. 6 (*b*)). Further, this back plate 27 is formed only at a position in proximity to the periphery of the insert hole 46 (the lock pin 33). In other words, this back plate 27 has an outline taken along an envelope line surrounding an entire outer edge of the insert hole 46 (the lock pin 33) when it is viewed from a front side. That is, this back plate 27 is formed in a shape reducing a redundant portion other than a portion corresponding to the insert hole 46 (the lock pin 33).

In addition, at the front face portion 23, a tear line 51 exposed to an airbag housing portion is formed (FIG. 1), and by means of cleavage of this tear line 51, a plurality of door portions 52 are formed at the time of expansion of the airbag. Further, three first to third door portions 55, 56, and 57 that are transversely symmetrical to each other are set at the door portion 52, and the first door portion 55 at which the emblem 24 is disposed is greater than a respective one of the remaining two door portions 56 and 57, and is disposed downward of these door portions 56 and 57.

Furthermore, the tear line 51 forming these door portions 52 can be also referred to as a predetermined line portion or a predetermined break portion or the like; is recessed in a grooved shape on the rear face (back face) side of the front plate portion 23; and is formed as a weak portion that is more vulnerable than a remaining portion of the front plate portion 23. This tear line 51 can be arbitrarily set according to the shape and number of door portions 52 targeted to be set, whereas in the embodiment, for example, the tear line is provided with lateral outer circumferential tear lines 61, 61 on both sides formed at both side parts along an outer circumferential part of the front plate portion 23; a connecting tear line portion 62 configured to connect these outer circumferential tear line portions 61, 61 to each other at a position more upward than the central part in the vertical direction; and an upper tear line portion 63 that is extended in a linear shape from the central part in the transverse direction of this connecting tear line portion 62 leading up to an upper end part of the outer circumferential part of the front plate portion 23.

Here, the connecting tear line portion 62 is integrally provided with: a curved bypass portion 62*a* configured to bypass the emblem 24; and connecting portions 62*b*, 62*b* extending in a linear shape from both sides of this bypass portion 62*a* to the outer circumferential tear line portions 61, 61.

Further, a hinge portion 65 that serves as a rotary shaft when the door portion 52 expand to the front face side is provided at a portion between the upper and lower ends of the outer circumferential tear lines 61, 61. That is, a portion at which the tear line 51 at the outer circumferential part of the front plate portion 23 is not formed is configured to bring the expanded door portion 52 into continuous contact with the peripheral plate portion 22 that is a non-expansion portion and the outer circumferential part of the top plate portion 21. Further, the hinge portion 65 (a hinge portion 65*a*) brought into continuous contact with the first door portion 55 is formed in a linear shape along the transverse direction, for example, and faces to the emblem 24. It is to be noted that the terminal portion of the outer circumferential tear line portions 61, 61 is curved so as to be folded back to the inner circumferential side as required in order to prevent advancement of cleavage.

Figure 7:
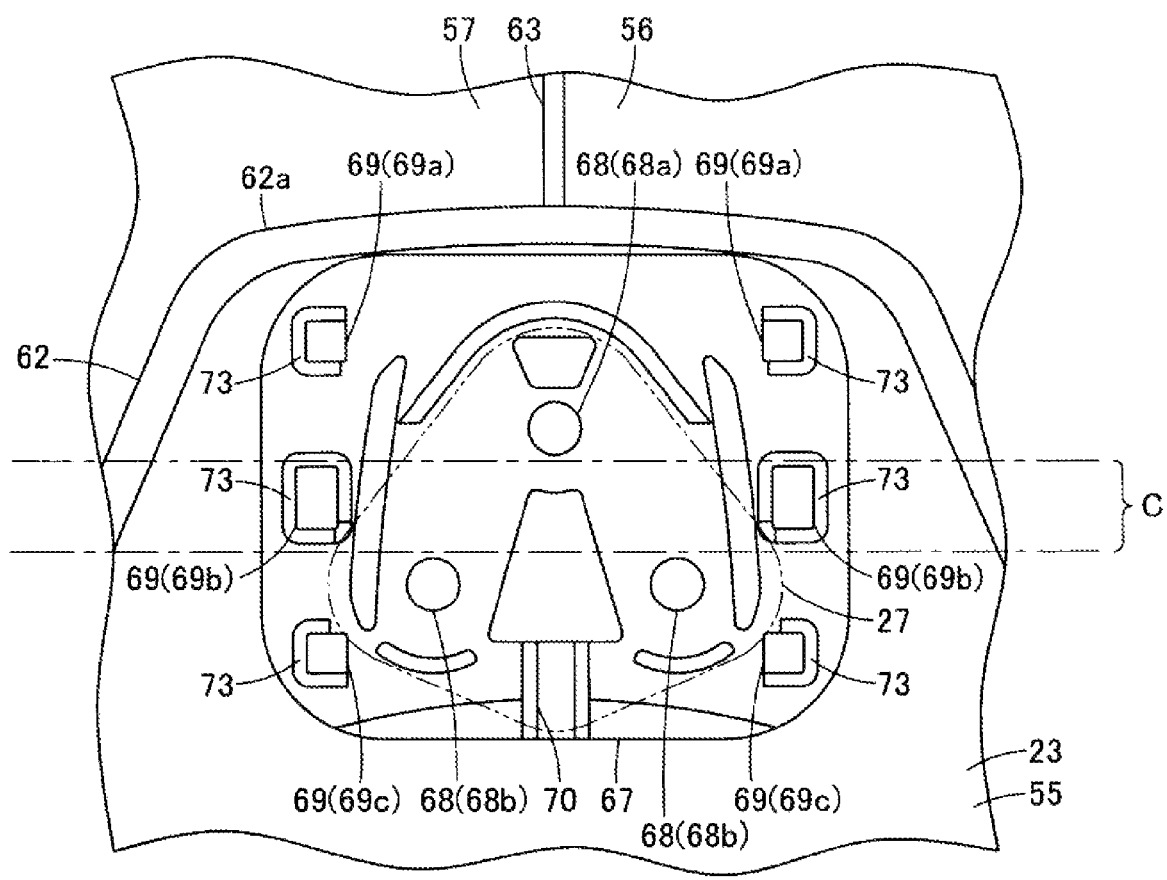
FIG. 7 is a rear view of a part of a cover main body portion of the same cover body for airbag device.
Figure 8:
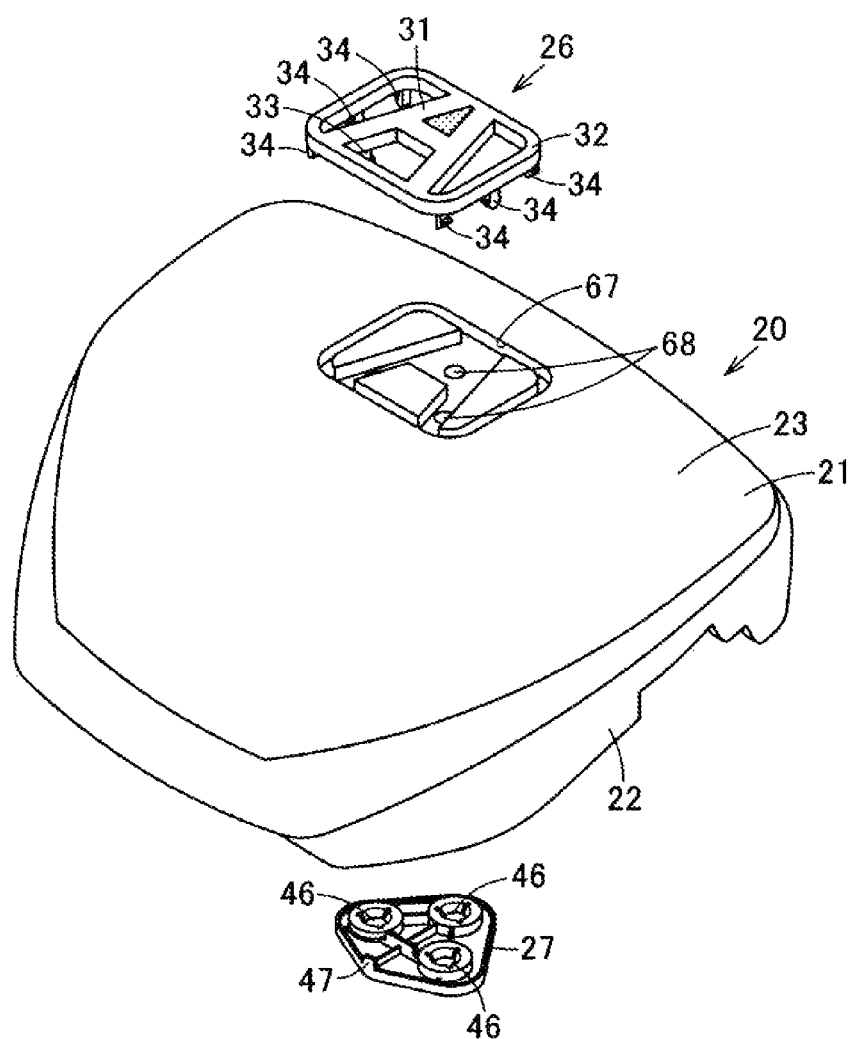
FIG. 8 is an exploded perspective view of the same cover body for airbag device.

In addition, a fitting recessed portion 67 that serves as a fitting portion that is located at the first door portion 55, the fitting portion being configured to engage the emblem body 26 of the emblem 24, are recessed on the surface side of the front plate portion 23, that is, at a position more upward of the central part in the transverse direction of a rear face side opposed to an occupant. This fitting recessed portion 67 can be formed in an arbitrary shape in which this emblem body 26 can be engaged according to the shape of the emblem body 26, whereas in the embodiment, the recessed portion is formed in an elongated substantially rectangular shape in which for corners each are curved in an arc shape, for example. In addition, the upper side and both sides of this fitting recessed portion 67 are surrounded by means of the bypass portion 62*a* of the connecting tear line portion 62. Further at this fitting recessed portion 67, an insert hole 68 for inserting the lock pin 33 of the emblem body 26 and a hook hole 69 that serves as an insert hook receptacle portion for inserting and hooking the hook pin 34 are respectively opened. Further, at the central part of the lower part on the rear face side of this fitting recessed portion 67 (at a position that corresponds to the fitting recessed portion 67 on the back face side of the front plate portion 23), a fitting groove portion 70 with which the positioning portion 47 of the back plate 27 is engaged is formed along the vertical direction (FIG. 7).

The insert hole 68 is formed in the shape of a circular hole, for example. In addition, at this insert hole 68, first and second insert holes 68a, 68b, 68b are set in correspondence with first and second lock pins 33a, 33b, 33b of the emblem body 26. In addition, hook holes 69 each is respectively formed in a longitudinally elongated rectangle shape along the vertical direction, for example. Further, with respect to hook holes 69, first to third hook holes 69a, 69b, 69c are set so as to correspond to first to third hook pins 34a, 34b, 34c of the emblem body 26. Furthermore, a position between the first insert hole 68a and the second insert holes 68b, 68b of these insert holes 68 and a distance between a position of a substantially central part of the second hook hole 69b of the hook hole 69 and the hinge portion 65a, in other words, a distance between the substantially central part of the fitting recessed portion 67 and the hinge portion 65a each are substantially equal to a distance between this hinge portion 65a and a position of a substantial center of a rim portion 14. Therefore, when the first door portion 55 expands, the substantially central part of the fitting recessed portion 67, that is, the substantially central part of the emblem 24 (the emblem body 26) is configured to abut against the rim portion 14 (a position in a band-shaped range C) or the like. Still furthermore, a width dimension of the hook hole 69 is capable of inserting the claw portion 43 of the hook pin 34 of the emblem body 26, and is defined so a width dimension which is smaller than that of the narrow portion 32 of this emblem body 26. In other words, each hook hole 69 is formed so as to be hidden behind the rear face side of the narrow portion 32 of the emblem body 26 that is engaged with the fitting recessed portion 67 (FIG. 3 (b1) and FIG. 3 (b2)). Further, on the rear side, that is, on the outer edge part of the hook hole 69 on the rear side of the front plate portion 23, a rib 73 for protection is protruded so as to surround this hook hole 69. This rib 73 is adapted so that the claw portion 43 of the hook pin 34 does not come into contact with the airbag; each corner portion of a tip end is chamfered, and the tip end is located more forward than the claw portion 43 of the hook pin 34 that is inserted into the hook hole 69 and then is hooked therewith.

Figure 1:
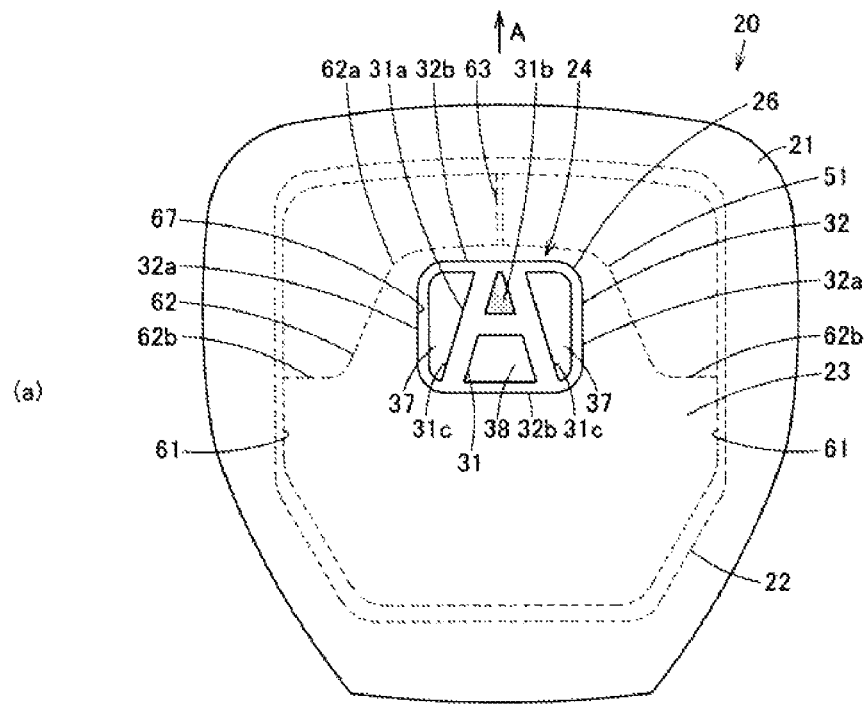
FIG. 1 shows an embodiment of a cover body for airbag device, according to the present invention, wherein FIG. 1 (*a*) is a front view of the cover body, and FIG. 1 (*b*) is a rear view of the cover body.
Figure 1:
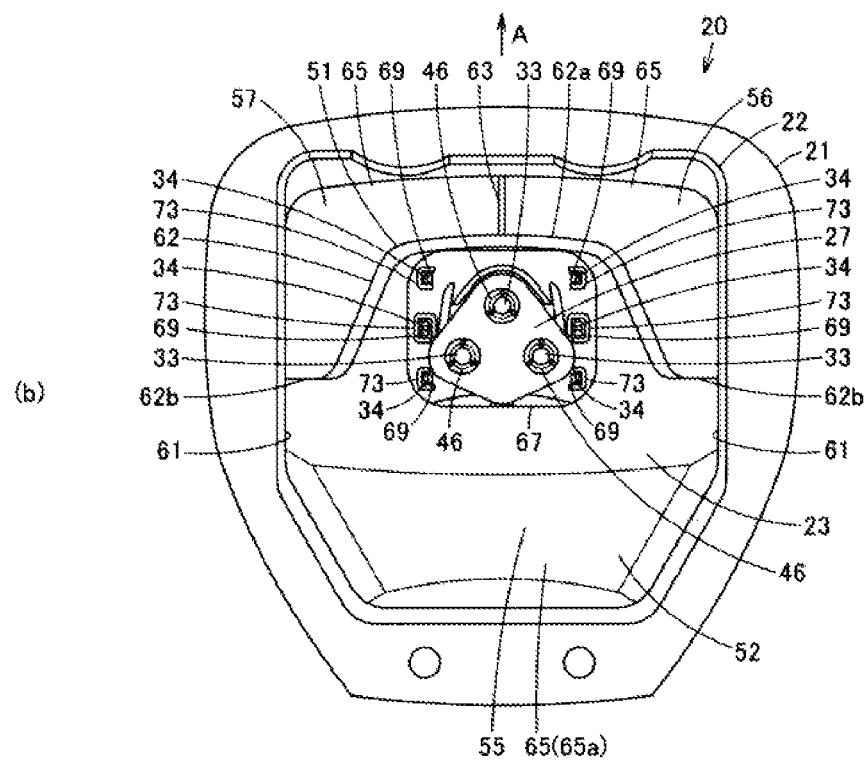
Figure 2:
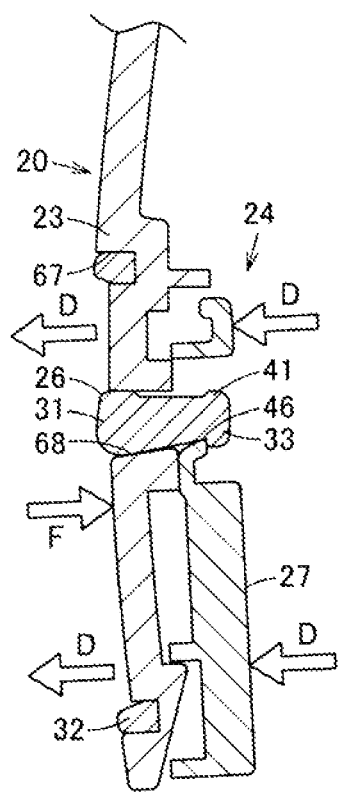
FIG. 2 is a sectional view of a part of the same cover body for airbag device.
Figure 3:
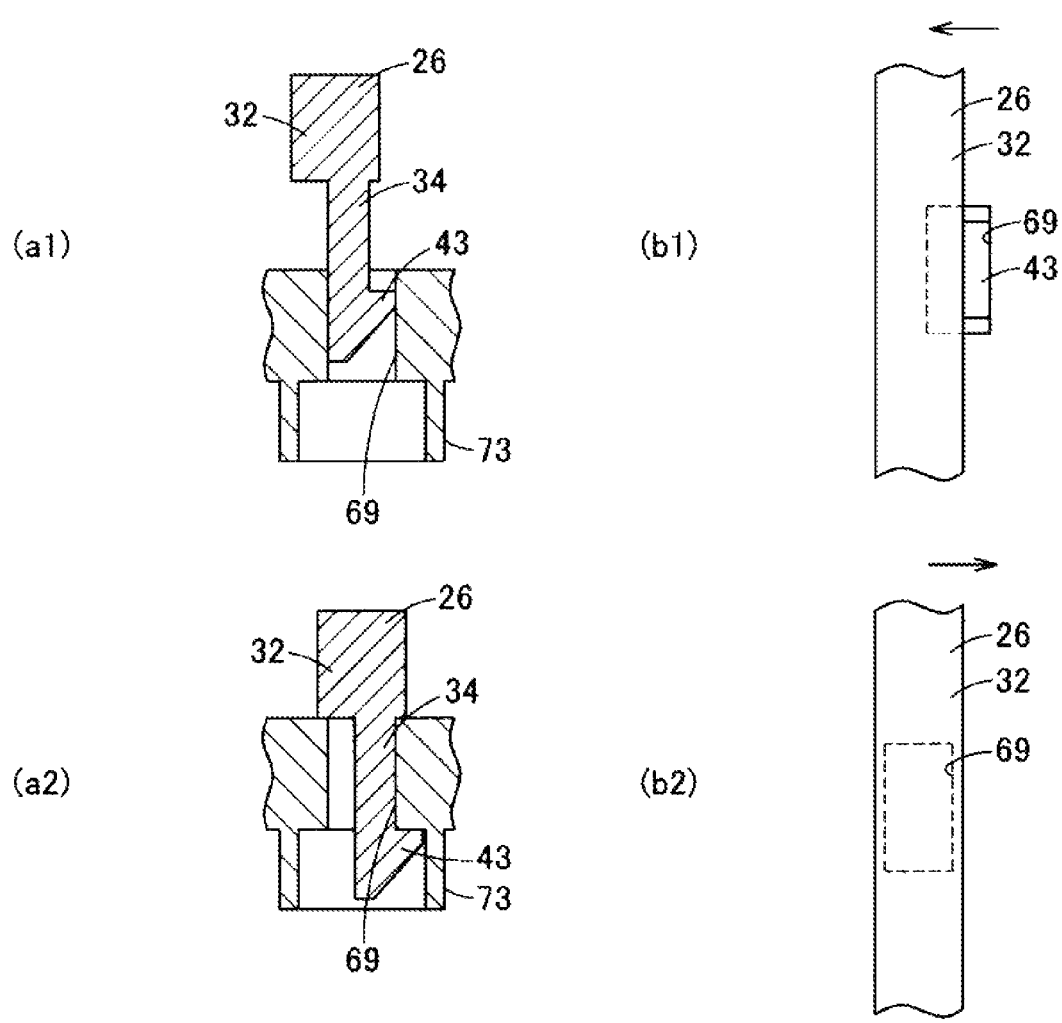
FIG. 3 (*a*1) is a sectional view showing a state in which an auxiliary hook portion of a decorative member of the same cover body for airbag device is inserted into the cover body.
Figure 4:
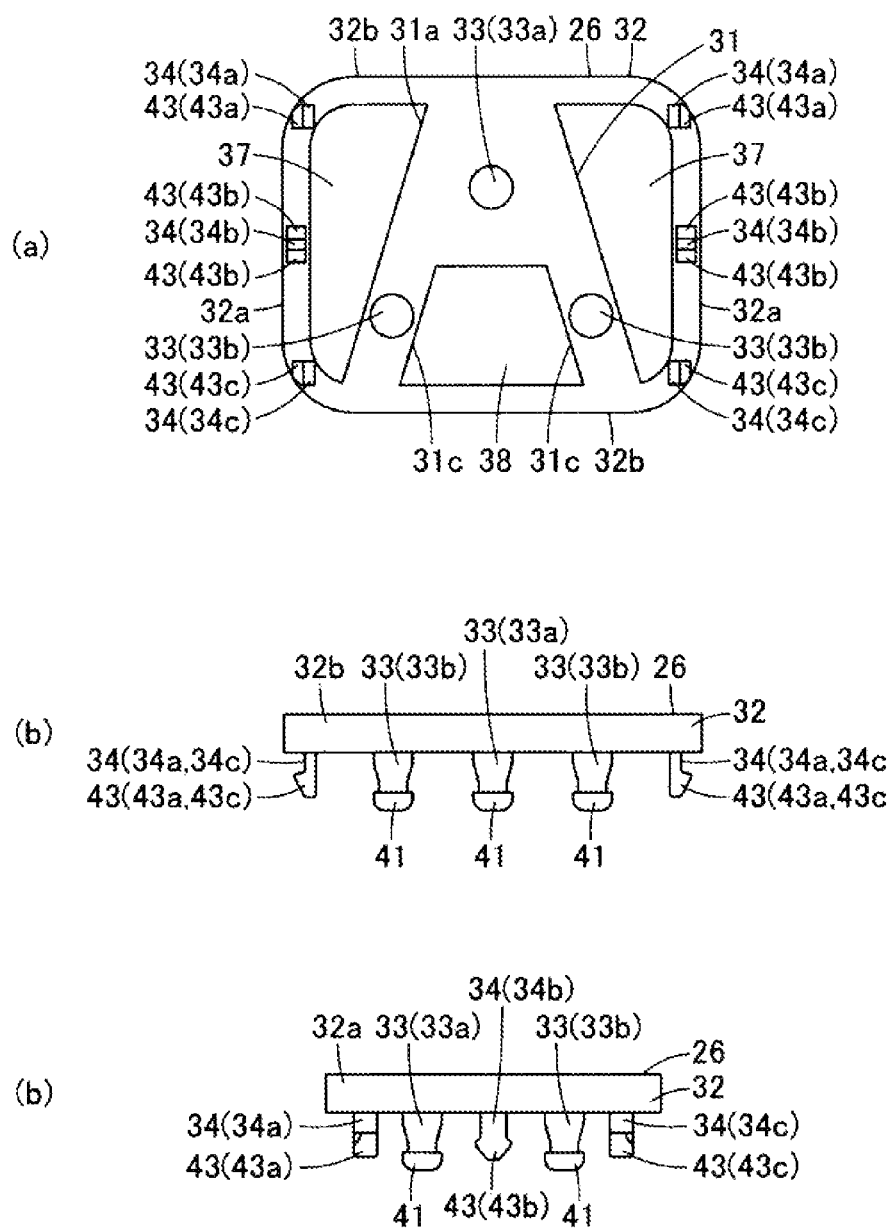
FIG. 4 shows a decorative member of the same cover body for airbag device, wherein FIG. 4 (*a*) is a rear view of the decorative member, FIG. 4 (*b*) is a side view shown from an upward side, and FIG. 4 (*c*) is a side view shown from a lateral side.
Figure 5:
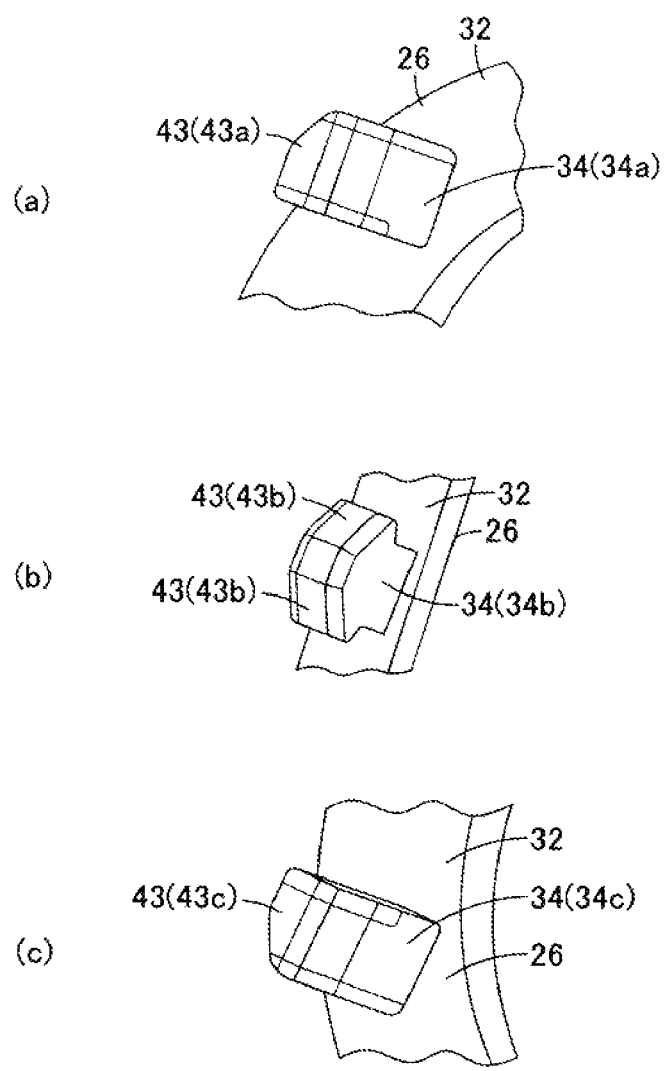
FIG. 5 (*a*) to FIG. 5 (*c*) are perspective views each showing an auxiliary hook portion of the same decorative member in an enlarged manner.
Figure 6:
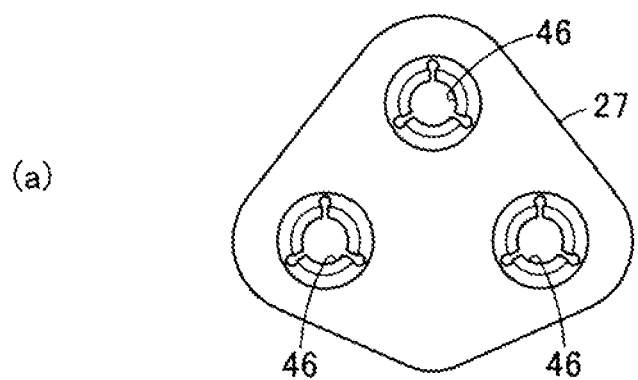
FIG. 6 show a mounting member of the same cover body for airbag device, wherein FIG. 6 (*a*) is a front view of the mounting member, and FIG. 6 (*b*) is a rear view of the mounting member.
Figure 6:
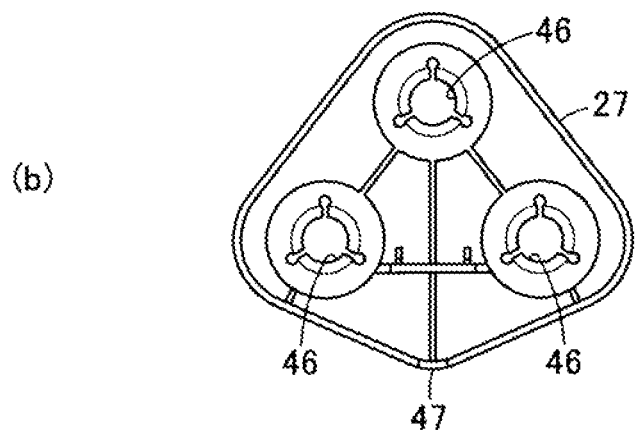

In addition, at the time of manufacture of the cover body 20, the top plate portion 21 and the peripheral plate portion 22 that include the front plate portion 23 are subjected to injection molding with a synthetic resin in advance, and thereafter, in a state in which the lock pin 33 and the hook pin 34 are respectively aligned with the insert hole 68 and the hook hole 69, a separately molded emblem body 26 is pressed from the surface side of the front plate portion 23 and then is engaged with the fitting recessed portion 67, whereby the lock pin 33 is inserted into the insert hole 68, and at the same time, the hook pin 34 is hooked with an edge part of the hook hole 69 on the rear face side of the door portion 52 (the first door portion 55) of the front plate portion 23 (FIG. 3 (a1) and FIG. 3 (a2)); the back plate 27 that is further separately molded is disposed on the rear face side of the door portion 52 (the first door portion 55) of the front plate portion 23; and a tip end side including the lock portion 41 of the lock pin 33 of the emblem body 26 that protrudes from the insert hole 68 is inserted (pressed) into the insert hole 46 of this back plate 27, whereby the lock portion 41 passes through the insert hole 46 and then is locked with the back face side of the back plate 27. As a result, with respect to the emblem body 26, the main body portion 31 (the main body primary portion 31a and the leg portions 31c, 31c) is fixedly secured by means of a lock between the lock pin 33 and the back plate 27 (the insert hole 46); the narrow portion 32 is hooked with the hook hole 69 of the hook pin 34, and is rigidly fixed at a predetermined position of the first door portion 55 of the front plate portion 23 all over. In this state, each hook pin 34 of the emblem body 26 is set at a position at which the claw portion 43 does not protrude more forward than a front end of the rib 73.

If any accident such as a collision occurs with an automobile that is provided with the steering wheel 10 including the airbag device 12 that is provided with this cover body 20, a control device starts up an inflator, and supplies a gas to the airbag. The airbag is then speedily inflates and expands, and due to this inflating and expanding pressure, the cover body 20 is broken along the tear line 51, and the door portion 52, in the embodiment, three first to third door portions 55, 56, ad 57 are formed. At this time, with respect to the airbag, abutment against the hook pin 34 (the claw portion 43) is prevented by means of the rib 73. Further, the door portions 55, 56, and 57 each turn around the hinge portion 65, and forms a protrusion opening that is an opening to inflate the airbag; and from this protrusion opening, the airbag expands to a forward side of an occupant to thereby protect the occupant.

At the time of expansion of each of these door portions 55, 56, and 57, with respect to the emblem 24, in a state in which the first door portion 55 expands, the emblem body 26 abuts against the rim portion 14 or the like at a position between the first lock pin 33a and the second lock pin 33b of the back plate 27, that is, in proximity to a substantially central position (the range C) of the back plate 27 (the emblem 24), and thus, this emblem body is subjected to an impact force (an external force) F substantially uniformly by means of the lock pins 33a, 33b, 33b (concentration of the impact force F on only a specific lock pin 33 is prevented), and the back plate 27 is located only in proximity to the lock pin 33, and thus, the back plate 27 is deformed in accordance with the emblem body 26 (the arrow D) without being stretched as a rigid body, and the emblem body 26 (the emblem 24) is reliably retained at the first door 55 (the front plate portion 23).

Thus, in the embodiment, the lock pin 33 is protruded at the main body portion 31 with a relatively large width of the emblem body 26; the hook pin 34 with a relatively small width is protruded at the narrow portion 32; the lock pin 33 is inserted into the door portion 52 (the first door portion 55) of the front plate portion 23, and the inserted lock pin is inserted into the insert hole 46 of the back plate 27 and then is locked therewith on the rear face side of the door portion 52 (the first door portion 55) of this front plate portion 23; and the hook pin 34 is configured so as to be inserted into the hook hole 69 of the door portion 52 (the first door portion 55) of the front plate portion 23 and then is hooked therewith.

Thus, the relatively thick main body portion 31 is reliably retained by inserting the lock pin 33 into the back plate 27 and then locking the inserted lock pin therewith, and the narrow portion 32 which is comparatively thin, and at which setting of the lock pin 33 is not easy, can be reliably retained at the front plate portion 23 by hooking the narrow portion with the front plat portion 23 by means of the hook pin 34. Therefore, by appropriately using the lock pin 33 and the hook pin 34 together in accordance with the shape of the emblem body 26, the emblem 24 that is provided with the emblem body 26 having the narrow portion 32 can be easily mounted on the front plate portion 23 while its related mounting strength is ensured.

That is, the narrow portion 32 is smaller in width and thus it is not easy to form a thick lock pin, and therefore, it is not easy to apply a lock structure exerted by a lock pin and the back plate 27 to the narrow portion 32. Accordingly, with regard to the narrow portion 32, by employing the lock pin 34 to be inserted into and hooked with the door portion 52 (the first door portion 55) of the front plate portion 23, the narrow portion 32 can be easily and reliably retained at the door portion 52 (the first door portion 55) without a need to increase the number of working steps, thus making it possible to prevent the narrow portion 32 from being lifted from the door portion 52 (the first door portion 55) of the front plate portion 23 due to a deformation exerted by a heat and humidity.

Moreover, the lock pin 33 and the hook pin 34 respectively protrude along a direction oriented to the front plate portion 23 (the door portion 52) at the time of mounting the emblem body 26, and thus, insertion of the lock pin 33 into the insert hole 68 and insertion and hooking of the hook pin 34 into and with the hook hole 69 are carried out at the same time by pushing the emblem body 26 into the fitting recessed portion 67 of the front plate portion 23 (the door portion 52), and therefore, even if a structure of insertion and hooking by the hook pin 34 is applied, the number of working steps does not increase, and the number of working steps is reduced, and its related manufacturing costs can be restrained.

In addition, the hook pin 34 is provided at the narrow portion 32 located in the periphery of the main body portion 31, and is disposed at a part of the periphery of the lock pin 33, whereby the periphery of a portion that is rigidly fixed by means of a lock between the lock pin 33 and the back plate 27 is hooked with the front plate portion 23 by means of the hook pin 34 and then the emblem body 26 (the emblem 24) can be retained at the front plate portion 23 more reliably.

In particular, the hook pins 34 are respectively disposed on both lateral sides of the lock pin 33 and thus the emblem body 26 (the emblem 24) can be reliably retained in a well-balanced manner with respect to the front plate portion 23, and these hook pins 34 are protruded at the narrow portion 32 that constitutes an outer edge part of the emblem body 26, and therefore, the hook pins 34 are located in proximity to an outline of the emblem body 26, and the entirety of this emblem body 26 can be reliably retained at the front plate portion 23 by means of the hook pins 34.

Further, the hook pin 34 is formed so as to be thinner than the lock pin 33, whereby the hook pin can be easily set at the narrow portion 32 regardless of whatsoever the shape of the narrow portion 32 may be.

Furthermore, the claw portions 43 of a plurality of hook pins 34 are protruded so as to be oriented in a direction in which the claw portions cross each other, whereby movement of the emblem body 26 can be restrained more reliably by means of these claw portions 43.

Specifically, the first and third claw portions 43a and 43c of the first and third hook pins 34a and 34c that are located on both of the left and right sides are protruded so as to be oriented outward along the transverse direction, and the second claw portion 43b of the second hook pin 34b is protruded along the vertical direction, whereby movement in a respective one of the transverse direction and the vertical direction of the emblem body 26 can be restrained by means of these claw portions 43a to 43c, and the emblem body 26 can be retained more stably.

In addition, the rib 73 protruding to the airbag side more significantly than a tip end of the hook pin 34 that is inserted into this hook hole 69 and then is hooked therewith is provided in the periphery on the rear face side of the door portion 52 (the first door portion 55) of the front plate portion 23 of the hook hole 69 where the hook pin 34 is to be inserted and hooked, whereby a tip end side of the hook pin 34 does not abut against the airbag at the time of deployment.

Further, a parting line of a die at the time of molding of the emblem body 26 is adapted so as not to be disposed at a tip end side of the hook pin 34, and the tip end side (the claw portion 43) of the hook pin 34 is chamfered, thereby making it possible to more reliably prevent damaging of the airbag if the airbag comes into contact with the tip end side of the hook pin 34.

Furthermore, the back plate 27 is located only in proximity to the lock pin 33 and thus the back plate is deformed in accordance with the emblem body 26, and the emblem body 26 (the emblem 24) can be reliably retained at the first door portion 55 (the front plate portion 23); therefore, a construction to deform in accordance with deformation of the emblem body 26 is provided; and accordingly, there is no need to increase an impact resistance of the back plate 27 by increasing a thickness, etc., and the back plate 27 can be relatively reduced in weight, thus reducing an impact if the first door portion 55 of the door portion 52 is expanded by deployment of the airbag and then the emblem body 26 abuts against the rim portion 14 or the like; not only the emblem body 26 (the emblem 24) can be retained more reliably against this impact force F, but also more various kinds of materials employed for the back plate 27 can be selected, and a material for the back plate 27 can be optimally set in consideration of its related strength, molding property, dimensional precision, and costs.

Still furthermore, the width of the narrow portion 32 is set so as to be larger than the width of the hook hole 69, whereby the hook hole 69 can be hidden by means of the narrow portion 32, and its related appearance is improved in a state in which the hook pin 34 protruding to the rear face side of the narrow portion 32 is inserted into the hook hole 69.

Figure 10:
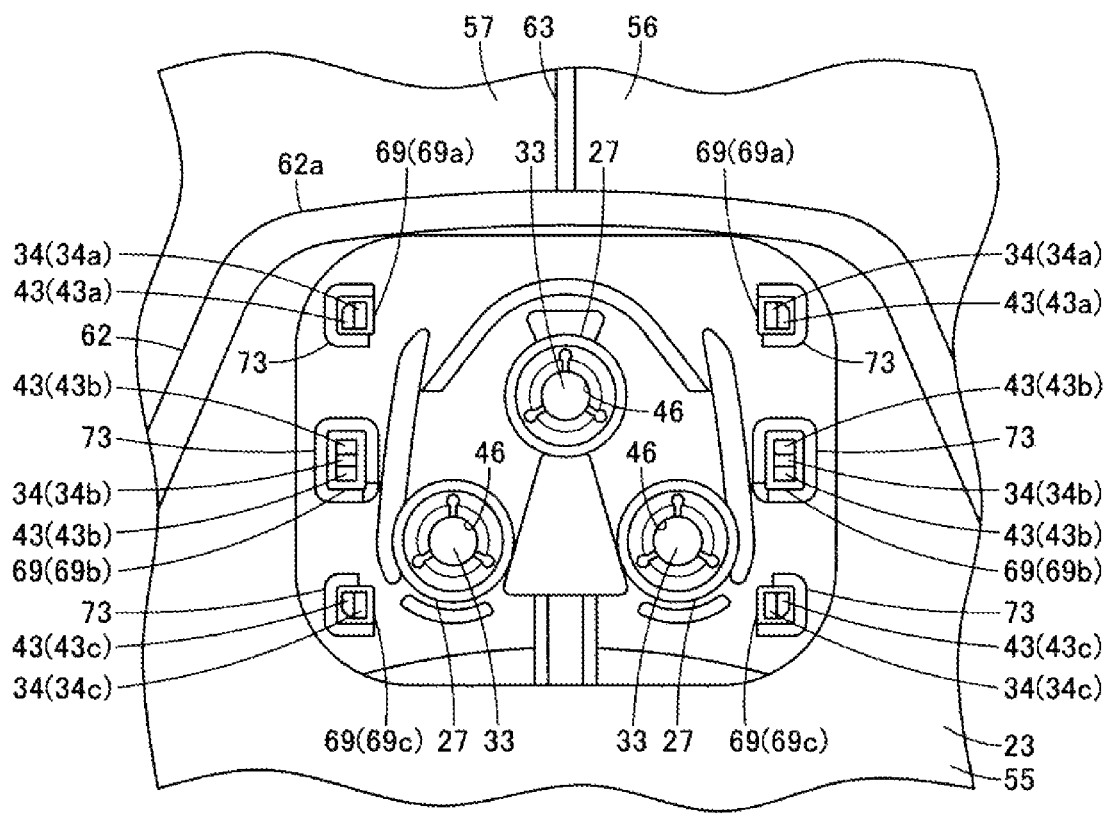
FIG. 10 is a rear view of a part of a cover main body portion according to another embodiment of a cover body for airbag device, according to the present invention.
Figure 11:
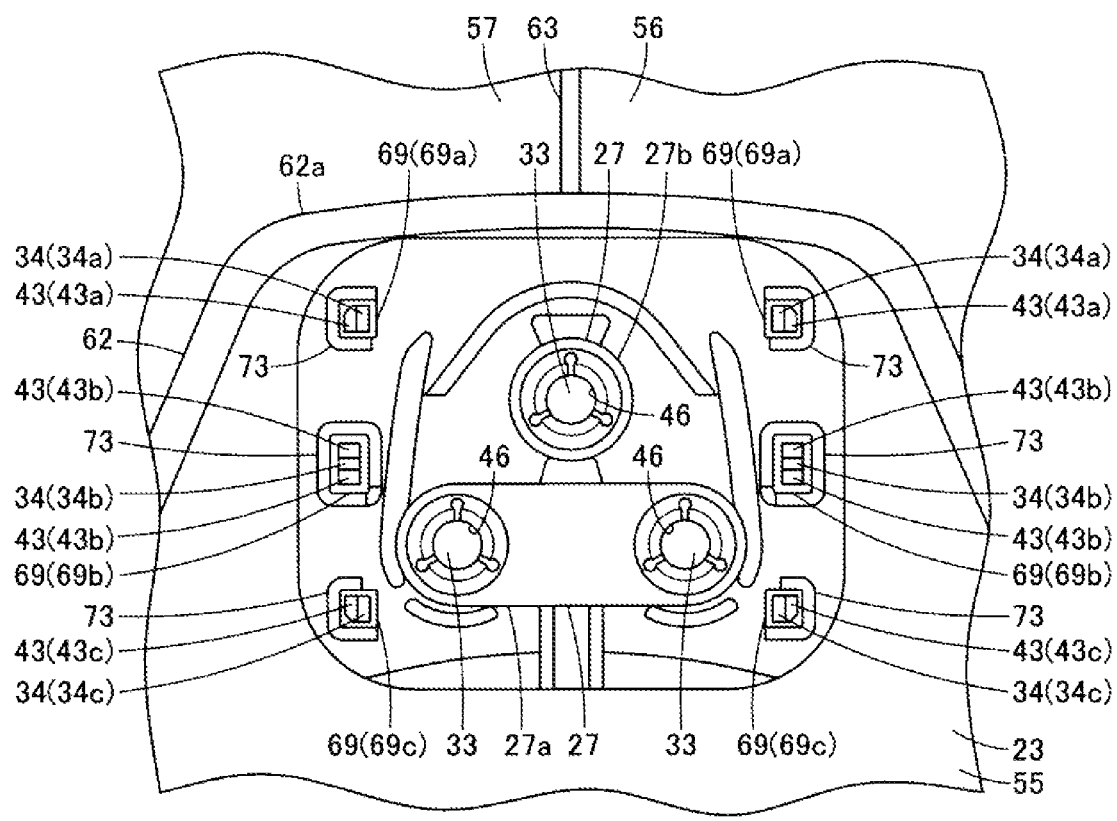
FIG. 11 is a rear view of a part of a cover main body portion according to still another embodiment of a cover body for airbag device, according to the present invention.

It is to be noted that in one of the foregoing embodiments, as shown in FIG. 10, the back plate 27 may be configured in plurality so as to be formed in a cylindrical shape to respectively surround the periphery of each insert hole 46, or alternatively, as shown in FIG. 11, the back plate may be configured so as to form a back plate 27a that is formed in an elongated circular shape connecting any plurality of, for example, two insert holes 46 to each other; and a circular back plate 27b to surround the periphery of other insert holes 46 that remain. In this case, it becomes possible to more reliably deform the back plate 27 in accordance with deformation of the emblem body 26 abutting against the rim portion 14 or the like when the first door portion 55 expands, and the emblem body 26 (the emblem 24) can be retained at the front plate portion 23 more reliably.

In addition, in each of the foregoing embodiments, the airbag device 12 may be compatible with an operating portion of a horn switch, for example.

Further, a lock pin is protruded at the back plate 27, and a lock receptacle portion configured to receive this lock pin may be provided at the emblem body 26.

Furthermore, the shapes of the cover body 20 can be arbitrarily set so as to correspond to the shapes of the steering wheel 10, respectively.

The present invention can be applied to a cover body for airbag device included in handles of various mobile entities or other sites in addition to the cover body for airbag device employed for a handle (a steering wheel) of an automobile.

What is claimed is:
1. A cover body for airbag device, comprising:
a cover main body portion configured to cover a housed airbag;

a tear line configured to define the cover main body portion, the tear line cleaving at a time of deployment of the airbag to form a door portion; and a decorative member, the decorative member including:

a decorative body having a decorative main body and a narrow portion that is formed so as to be continuous to the decorative main body, the narrow portion being smaller in width than the decorative main body, the decorative body being located on a front face side of the door portion;

a mounting member separate from the decorative body, and located on the back face side of the door portion;

a main lock portion protruded to either one of the decorative main body of the decorative body and the mounting member, and inserted into the door portion;

a lock receptacle portion provided at a remaining one of the decorative main body of the decorative body and the mounting member, and in which the main lock portion that is inserted into the door portion is inserted to thereby lock the main lock portion; and an auxiliary hook portion protruded to the narrow portion of the decorative body, and including a claw portion inserted into and then hooked with the door portion;

wherein the auxiliary hook portion includes a plural of auxiliary hook portions that has respectively the claw portion of a different shape, and the claw portion of one auxiliary hook portion and the claw portion of a remaining auxiliary hook portion are protruded oriented in a direction in which the claw portions cross each other.

2. The cover body for airbag device, according to claim 1, wherein the narrow portion is located at least at a part of a periphery of the decorative main body, and the auxiliary hook portion is located at the narrow portion, and is disposed at least at a part of a periphery of the main lock portion.

3. The cover body for airbag device, according to claim 1, wherein the auxiliary hook portion is formed so as to be thinner than the main lock portion.

4. A cover body for airbag device, comprising:

a cover main body portion configured to cover a housed airbag;

a tear line configured to define the cover main body portion, the tear line cleaving at a time of deployment of the airbag to form a door portion; and a decorative member, the decorative member including:

a decorative body having a decorative main body and a narrow portion that is formed so as to be continuous to the decorative main body, the narrow portion being smaller in width than the decorative main body, the decorative body being located on a front face side of the door portion;

a mounting member separate from the decorative body, and located on the back face side of the door portion;

a main lock portion protruded to either one of the decorative main body of the decorative body and the mounting member, and inserted into the door portion;

a lock receptacle portion provided at a remaining one of the decorative main body of the decorative body and the mounting member, and in which the main lock portion that is inserted into the door portion is inserted to thereby lock the main lock portion; and an auxiliary hook portion protruded to the narrow portion of the decorative body, and including a claw portion inserted into and then hooked with the door portion;

wherein a rear face side of the door portion is provided with a protective rib at least partially surrounding the claw portion of the auxiliary hook portion hooking the decorative body with the door portion to prevent contact of the auxiliary hook portion with the airbag.

* * * * *